United States Patent Office 3,345,129
Patented Oct. 3, 1967

3,345,129
SELECTIVE CLEAVAGE OF MONOAMI-
DOTRIPHOSPHATES TO PRODUCE OR-
THOPHOSPHORAMIDATES
Kenneth J. Shaver, St. Louis, Mo., assignor to Monsanto
Company, St. Louis, Mo., a corporation of Delaware
No Drawing. Filed Dec. 11, 1964, Ser. No. 417,784
15 Claims. (Cl. 23—101)

ABSTRACT OF THE DISCLOSURE

A process wherein dialkali metal, diammonium or mixed monoammonium-alkali metal orthophosphoramidates are produced by subjecting an aqueous solution of a monoamidotriphosphate to a pH above about 8.5. Suitable monoamidotriphosphates include alkali metal monoamidotriphosphates, ammonium monoamidotriphosphates and mixed alkali metal-ammonium monoamidotriphosphates.

---

The present invention relates to processes for manufacturing water-soluble salts of phosphoramidic acid. More particularly, the present invention relates to processes for manufacturing alkali metal, ammonium, and mixed alkali metal-ammonium orthophosphoramidates, which are useful as corrosion inhibitors and as intermediates in the preparation of sequestering agents and alkaline builders for detergent compositions.

It is an object of this invention to provide processes for the manufacture of the aforementioned orthophosphoramidates in a relatively inexpensive manner.

It is another object of the present invention to provide processes for the manufacture of the aforementioned orthophosphoramidates, in which processes water soluble monoamidotriphosphates are utilized.

These objects, as well as others which will become apparent from the following discussion and claims, can be accomplished by subjecting an aqueous solution of a water-soluble monoamidotriphosphate to a pH above about 8.5. The water-soluble monoamidotriphosphates useful in these processes are those having the structure (1) 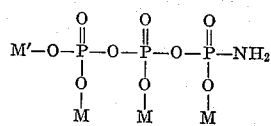

wherein M is either an alkali metal cation (Na, K, Li, Rb, Cs, Fr) or NH$_4$, and M' is a water-soluble cation, and is preferably either an alkali metal cation or NH$_4$, but can also be H. Note that all of the "M's" in Formula 1 are not necessarily identical. As a matter of fact, in aqueous solution, because the cations represented by M ionize, the actual identity of M is not only difficult to ascertain, but also not critical in so far as the successful practice of the present invention is concerned, because any water-soluble monoamidotriphosphate can be used. In order to obtain the desired dialkali metal, di-ammonium, or mixed alkali metal-ammonium orthophosphoramidate product in accordance with these processes, there need only be a significant amount of appropriate cations present in the aqueous solutions (of monoamidotriphosphate) when the pH of the solutions is raised significantly above about 8.5. For optimum yields of the desired products, it is preferred, however, that the monoamidotriphosphate be either an alkali metal, an ammonium, or a mixed alkali metal-ammonium monoamidotriphosphate.

The preferred water soluble monoamidotriphosphate raw materials (for the processes of the present invention) can be prepared by reacting together in water an appropriate alkali metal, ammonium, or mixed alkali metal-ammonium trimetaphosphate and ammonium hydroxide, thus:

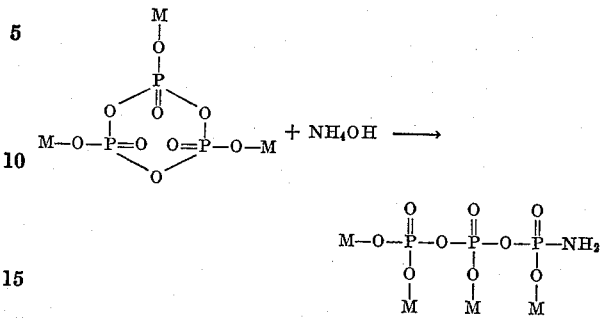

In the reactions of the present invention, the following is believed to take place:

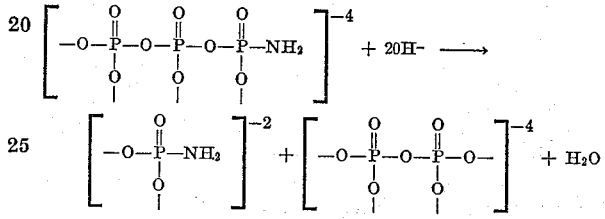

Evidently the desired reaction is pH-dependent. Thus, the identity of the particular base that is present in the reaction mixture (in order to bring the pH of the aqueous reaction mixture to a point at which the desired reaction takes place) is unimportant in so far as the operability of the present generic processes is concerned.

Although the desired reaction takes place to some extent when the pH of the aqueous solutions of monoamidotriphosphate is slightly above about 8.5, generally significantly faster, more desirable, reaction rates are obtained when the pH is at least about 10. Still further preferred reaction solution pH's are those above about 11, since at these very high pH's at least part of the by-product pyrophosphate generally can be precipitated out of solution and recovered for subsequent further use. At the outset of the processes of this invention, solutions of the monoamidotriphosphate generally have pH's above about 5, since at lower solution pH's, reversion of some of the triphosphate occurs.

The elevated pH's at which the present processes can be carried out can readily be obtained by simply dissolving into the water (in which the reaction is to be carried out) enough of a strong base to bring to pH of the reaction mixture to the desired level. Since the particular strong base utilized apparently does not enter directly into the formation of the desired orthophosphoramidates in the practice of these processes (except to provide cations for the product phosphoramidates and to effect the solubility of the by-product pyrophosphate) any strong base that can cause the formation of hydroxyl ions when the base is dissolved into water can be used. Thus, the aforementioned "strong bases" that are useful in the practice of the present invention are those that yield a solution pH measured at 25° C. of at least about 9 when they are dissolved at the 0.5 weight percent level. It will be understood that the term "strong base" encompasses, for example, such basic compounds as alkali metal and ammonium carbonates, alkali metal and ammonium silicates, tri-alkali metal orthophosphates, alkali metal and alkaline earth metal oxides and the like (which compounds do not actually contain hydroxyl anions, but which cause hydroxyl ions [high pH] to result when they are dissolved in water), as well as some of the organic quaternary ammonium hydroxides, ammonium hydroxide, alkali metal hydroxides, and alkaline earth metal hydroxides such as calcium hydroxide, magnesium hydroxide, etc. For economic reasons, generally inorganic "strong bases" will be used in the practice of these processes. Of these, it is preferred that alkali metal and ammonium hydroxides, carbonates and silicates be utilized. Still further preferred are the sodium, potassium, and ammonium forms of these materials.

The amount of the various strong bases described above that can be utilized in this invention will vary considerably, depending upon such factors as the molecular weight of the base, its basic strength, rate of dissolution in water, etc. The amount, however, will always be sufficient to furnish enough hydroxyl ions so that the pH of the aqueous reaction mixture is maintained above about 8.5 during the period of time in which it is desired for the reaction to take place. Preferably between about 0.5 and about 10 moles of base per mole of amidotriphosphate should be used in the present processes, although more or less than these amounts can also be used advantageously. When optimum yields of orthophosphoramidate are desired, between about 1.8 and about 4 moles of base per mole of starting amidotriphosphate should be used in these processes. In addition, for optimum yields of the desired orthophosphoramidate, it is preferred that at least about 5 weight percent of the amidotriphosphate raw material be present initially in the reaction mixtures of the present invention.

In the following examples, which are illustrative of some of the preferred embodiments of the present invention, all parts and percentages are by weight unless otherwise specified.

EXAMPLE I

*(a) Preparation of amidotriphosphate*

Into a conventional stainless steel, jacketed reaction vessel fitted with a fairly efficient stirrer are added 1000 parts of trisodium trimetaphosphate and 500 parts of water. The resulting slurry is then warmed to a temperature of about 50° C. To the warm slurry are then added 520 parts of a 15% aqueous solution of NH$_4$OH. The temperature of the resulting reaction mixture is maintained at about 60° C. for the next 60 minutes, during which time the slurry is converted to a clear solution. The pH of the resulting product is then adjusted to 8 by the addition of a small amount of NaOH, at which pH the solution is indefinitely stable. The resulting product is an approximately 50% solution of trisodium monoammonium monoamidotriphosphate.

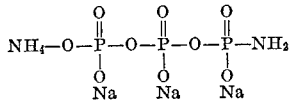

*(b) Conversion of amidotriphosphate to orthophosphoramidate*

To the solution prepared in part (a), above, in the same reaction vessel are added 360 parts of a 50% aqueous solution of NaOH. Upon being warmed to about 65° C., a colorless crystalline precipitate (which is subsequently determined to be tetrasodium pyrophosphate) is observed in the reaction mixture. After 60 minutes at the temperature of about 65° C., the resulting reaction mixture is filtered. The filtrate is then dried on a steam heated stainless steel roll. The resulting dried product is almost entirely disodium orthophosphoramidate.

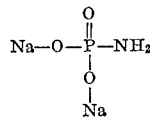

EXAMPLE II

Utilizing a procedure such as that detailed in Example I, part (b), above, 2000 parts of a 25 percent aqueous solution of tripotassium monoammonium amidotriphosphate are reacted together with 560 parts of a 25% aqueous solution of KOH. The resulting 25% aqueous solution of reaction product is found (by analysis of its nuclear magnetic resonance spectra) to consist mostly of pyrophosphate and monoamido-orthophosphoramidate.

EXAMPLE III

Into 1625 parts of a 20% aqueous solution of tetraammonium amidotriphosphate are stirred 700 parts of a 15% aqueous solution of NH$_4$OH. The reactor is then sealed, so that none of the ammonia vapors are permitted to escape therefrom. The mixture is then warmed to about 60° C., with continuous agitation, and then maintained at that temperature for 150 minutes. It is then cooled to below about 35° C., and removed from the reaction vessel. Nuclear magnetic resonance analysis of the resulting mixture reveals that it contains not only a large amount of the desired monoamido-orthophosphoramidate, but also some diamido-orthophosphoramidate, and some amidopyrophosphate, in addition to regular pyrophosphate and a small amount of unreacted amidotriphosphate.

EXAMPLE IV

Utilizing a procedure such as that detailed in Example I, part (b), 2000 parts of a 40% aqueous solution of monoammonium tripotassium monoamidotriphosphate are intermixed with 600 parts of a 50% aqueous solution of N$_a$OH. The anionic portion of the resulting (aqueous solution) reaction product consists largely of ordinary pyrophosphate and monoamidophosphoramidate anions.

EXAMPLE V

Example IV is repeated, except that disodium monolithium monoammonium amidotriphosphate is utilized instead of the monoammonium tripotassium amidotriphosphate of Example IV. In this instance, some pyrophosphate is precipitated out of solution during the reaction period, resulting in a higher ratio of monoamidophosphoramidate (to pyrophosphate) anions in the final product solution.

EXAMPLE VI

Example IV is repeated, except that a 27% aqueous solution of tetralithium monoamidotriphosphate is utilized (in place of the NH$_4$K$_3$P$_3$O$_9$NH$_2$ of Example IV), and 528 parts of a 25% aqueous solution of LiOH are used. The monoamido-orthophosphoramidate in the aqueous solution of the reaction product retains its identity after first being drum dried on a conventional stainless steel steam-heated drum drier and then being redissolved in water.

EXAMPLE VII

Utilizing a procedure such as that detailed in Example I, part (b), above 4000 parts of a 25% aqueous solution of tetrasodium monoamidotriphosphate are intermixed with 600 parts of a 50% slurry of calcium hydroxide. During the reaction, almost all of the pyrophosphate formed precipitates practically immediately as the calcium disodium salt, while most of the desired monoamidophosphoramidate remains in solution. After the filtration step, the water can be removed from the phosphoramidate solution if desired by a number of conventional techniques, including simply spray-drying the solution.

EXAMPLE VIII

Example VII is repeated, except that 600 parts of dry powdered Na$_2$CO$_3$ are utilized in place of the slurry of Ca(OH)$_2$. The reaction is complete when the precipitation of tetrasodium pyrophosphate from the hot reaction mixture ceases.

What is claimed is:

1. A process for manufacturing a phosphoramidate selected from the group consisting of dialkali metal orthophosphoramidates, diammonium orthophosphoramidates, and mixed monoalkali metal-monoammonium orthophosphoramidates, which process comprises subjecting an aqueous solution of a monoamidotriphosphate compound selected from the group consisting of alkali metal monoamidotriphosphates, ammonium monoamidotriphosphate and mixed alkali metal-ammonium monoamidotriphosphate to a pH above about 8.5.

2. A process as in claim 1, wherein said phosphoramidate is a dialkali metal orthophosphoramidate and said monoamidotriphosphate compound is a tri-alkali metal monoamidotriphosphate.

3. A process as in claim 1, wherein said phosphoramidate is a diammonium orthophosphoramidate, said monoamidotriphosphate compound is tetra-ammonium monoamidotriphosphate, and the pH of said aqueous solution is raised to above about 8.5 by addition to said aqueous solution of between about 0.5 and about 10 moles of NH$_4$OH per mole of said monoamidotriphosphate compound.

4. A process as in claim 2, wherein said dialkali metal orthophosphoramidate is disodium orthophosphoramidate and said tri-alkali metal monoamidotriphosphate is monoammonium trisodium monoamidotriphosphate.

5. A process as in claim 2, wherein said dialkali metal orthophosphoramidate is dipotassium orthosphophoramidate and said tri-alkali metal monoamidotriphosphate is tripostassium monoamidotriphosphate.

6. A process for manufacturing a phosphoramidate selected from the group consisting of dialkali metal orthophosphoramidates, diammonium orthophosphoramidates, and mixed alkali metal-ammonium orthophosphoramidates which process comprises increasing the pH of an aqueous solution of a monoamidotriphosphate compound selected from the group consisting of alkali metal monoamidotriphosphates, ammonium monoamidotriphosphate, and mixed alkali metal-ammonium monoaidotriphosphate to above about 10; the pH of said aqueous solution initially being between about 5 and about 8.5.

7. A process as in in claim 6, wherein phosphoramidate is a dialkali metal orthophosphoramidate and said monoamidotriphosphate compound is a tri-alkali metal monoamidotriphosphate.

8. A process as in claim 7, wherein said dialkali metal orthophosphoramidate is disodium orthophosphoramidate, said tri-alkali metal monoamidotriphosphate is trisodium monoamidotriphosphate, and the pH of said aqueous solution is increased to above about 10 by addition of sodium hydroxide therto.

9. A process as in claim 7, wherein said dialkali metal orthophosphoramidate is dipotassium orthophosphoramidate and said tri-alkali metal monoamidotriphosphate is trisodium monoamidotriphosphate.

10. A process for manufacturing disodium orthophosphoramidate which comprises intermixing with an aqueous solution of trisodium monoamidotriphosphate having a pH of from about 6.5 to about 8.5 an amount of a base selected from the group consisting of ammonium hydroxide, sodium oxide, sodium hydroxide and sodium carbonate to thereby raise the pH of the resulting mixture to above about 8.5; said amount of base being from about 0.5 to about 10 moles per mole of said trisodium monoamidotriphosphate in said aqueous solution.

11. A process as in claim 10, wherein said base is sodium hydroxide and said amount of base is from about 1.8 to about 4 moles per mole of said trisodium monoamidotriphosphate.

12. A process which comprises of the steps of
    (a) reacting together in a first aqueous solution having a pH between about 6 and about 8.5 a trimetaphosphate selected from the group consisting of ammonium trimetaphosphate, alkali metal trimetaphosphate, and mixed alkali metal-ammonium trimetaphosphate with ammonium hydroxide to thereby produce a second aqueous solution containing dissolved therein a water-soluble monoamidotriphosphate, and
    (b) increasing the pH of said second aqueous solution to above about 10; whereby an orthophosphoramidate selected from the group consisting of dialkali metal orthophosphoramidates, diammonium orthophosphoramidate, and mixed alkali metal-ammonium orthophosphoramidates is produced.

13. A process which comprises intermixing with an aqueous solution containing dissolved therein at least about 5 weight percent of a tri-alkali metal monoamidotriphosphate an amount of ammonium hydroxide equal to from about 1.8 to about 10 moles of ammonium hydroxide per mole of said monoamidoetriphosphate.

14. A process as in claim 13, wherein said trialkali metal monoamidotriphosphate is trisodium monoamidotriphosphate.

15. A process according to claim 12 wherein said trimetaphosphate is sodium trimetaphosphate.

References Cited

Quimby et al., Zeitschrift fur Anorg. u Allgem. Chemie. Bd. 295–296, pp. 220–228 (1958).

Narath et al., J. Amer. Chem. Soc., 78, pp. 4493 and 4494 (1956).

OSCAR R. VERTIZ, *Primary Examiner.*

A. J. GREIF, *Assistant Examiner.*